United States Patent [19]
Martin

[11] Patent Number: 5,589,979
[45] Date of Patent: Dec. 31, 1996

[54] SIMULATOR ARRANGEMENT

[75] Inventor: Donald L. M. Martin, Mosman, Australia

[73] Assignee: Trutan Pty Limited, Homebush, Australia

[21] Appl. No.: 211,100

[22] PCT Filed: Jan. 27, 1993

[86] PCT No.: PCT/AU93/00037

§ 371 Date: Mar. 15, 1994

§ 102(e) Date: Mar. 15, 1994

[87] PCT Pub. No.: WO93/17366

PCT Pub. Date: Sep. 2, 1993

[30]   Foreign Application Priority Data

Feb. 20, 1992 [AU] Australia ................... 11088/92

[51] Int. Cl.⁶ .......... G03B 21/10; G03B 21/56; G02B 5/08; G02B 27/10
[52] U.S. Cl. .......... 359/449; 359/459; 359/619; 359/627; 359/636; 359/839; 359/868; 353/79; 353/122
[58] Field of Search ............ 359/446, 449, 359/459, 489, 618, 627, 636, 839, 850, 855, 856, 869, 857, 868, 619; 353/77, 79, 122, 71, 74, 78

[56]   References Cited

U.S. PATENT DOCUMENTS

| | | | |
|---|---|---|---|
| 2,132,904 | 10/1938 | Martinez et al. | 359/446 |
| 2,617,329 | 11/1952 | Dreyer | 359/489 |
| 3,248,165 | 4/1966 | Marks et al. | 359/449 |
| 4,040,726 | 8/1977 | Paca | 359/839 |
| 5,080,481 | 1/1992 | Martin et al. | 359/446 |

FOREIGN PATENT DOCUMENTS 2214145  8/1989  United Kingdom ........ 359/843

Primary Examiner—Ricky D. Shafer
Attorney, Agent, or Firm—Abelman, Frayne & Schwab

[57]   ABSTRACT

A screen simulator arrangement includes spaced apart screen and one or more mirror means; said screen means is formed with a plurality of spaced apart transparent portions therein; said mirror means is formed or provided with a plurality of holes or openings therein; said screen and said mirror means are fixedly located relative to each other; the transparent portions of said screen means and the holes or openings of said mirror means are substantially out of register one with the other. An inner screen surface of said screen means and a reflective surface of said mirror means generally face inwardly towards each other, said transparent portions of said screen means and said holes or openings of said mirror means being so out of register one with the other, such that screen portions of said screen means are in substantial alignment/register with holes or openings in said mirror means. The arrangement is such that projection means spaced apart from an outer surface of said mirror means projects images at said outer surface and through said holes or openings therein so that imagery will appear on said screen portions of said screen means in substantial alignment/register with said holes or openings in said mirror means. The imagery is then reflected by reflective portions of said mirror means, so as to be viewable through said transparent portions in said screen means from a position spaced from an outer surface of said screen means.

3 Claims, 3 Drawing Sheets 5,589,979

SIMULATOR ARRANGEMENT

BACKGROUND OF THE PRESENT INVENTION

The present invention relates to a screen simulator arrangement which sets out to provide a person or persons with a substantially realistic simulation of surroundings and/or happenings.

Simulator arrangements are currently known which, generally speaking, comprise cabins, housings, cockpits, seats and the like, from which projected imagery of surroundings, happenings, rides, flights or other movement or surroundings is/are viewed. Often this is viewed in substantial synchronisation with inertial effects. For example, in many cases such simulators are used for flight training and/or the training of motor vehicle drivers. This is however by way of example only. In various cases, however, simulator arrangements are used for entertainment and amusement purposes.

One of the important features of the screen simulator arrangements known up until this time is the screening system, whereby imagery is screened to a viewer or viewers, such as to give a realistic simulation of surroundings and/or happenings. To a large extent, less sophisticated units previously known and available project imagery for viewing directly onto a video or film screen. On the other hand, more sophisticated arrangements attempt to present imagery at virtual infinity. Images shown at virtual infinity appear to be beyond framing borders of the screen; indeed, they appear to be outside the screen or capsule containing the screen.

Many of the commercial type-virtual imagery simulator arrangements known up until this time suffer from practical limitations of size, weight and cost, in that the systems are often confined to small window simulators—for example, simulators of fighter-bomber windows; submarine periscopes, gunsights and the like. While adequate for these purposes, they are not appropriate/adequate for use in entertainment systems, where large capacity is required.

Further, in entertainment systems, imagery is often viewed directly on screens such as to appear as flat imagery situated at the screen position. The extent to which realism can be contrived from directly viewed screens is limited and, generally speaking, of a poor quality.

By way of example, screen simulator arrangements previously disclosed are known from international patent specification No WO 89/09431, U.S. Pat Nos. 2,132,904, 2,511, 702, 3,198,066, 3,316,053, 3,480,346, 3,741,638, 4,167,311 and United Kingdom patent specifications Nos 147,404 and 167,340.

It is an object of this invention to provide a screen simulator arrangement which provides enhanced realism and/or depth of imagery.

It is a further object of this invention to provide a screen simulator arrangement which increases capacities and enhances the imagery of the simulator arrangements known up until this time.

It is also an object of this invention to provide a screen simulator arrangement which overcomes or at least minimises problems and/or disadvantages apparent in screen simulator arrangements disclosed and known up until this time.

Other objects of this invention will become apparent from the following description.

SUMMARY OF THE PRESENT INVENTION

According to one aspect of this invention there is provided a screen simulator arrangement, including spaced apart screen means and one or more mirror means; said screen means being formed with a plurality of spaced apart transparent portions therein and said mirror means being formed with a plurality of holes or openings therein; said screen and mirror means being fixedly located relative to each other; the transparent portions of said screen and the holes or openings of said mirror means being out of register one with the other; a screen surface of said screen means and a reflective surface of said mirror means generally facing inwardly towards each other; said transparent portions of said screen means and said holes or openings of said mirror means being so out of register one with the other, that screen portions of said screen means are in fixed substantial alignment/register with holes or openings in said mirror means; projection means being spaced apart from an outer surface of said mirror, such as to project imagery at a rear surface of said mirror means and through said holes or openings therein, so that said imagery will appear on said portions of said screen surface in substantial register with said holes or openings in said mirror; inwardly facing reflective portions of said mirror reflecting imagery from said portions of screen surface through said transparent portions of said screen means, so as to be viewed from a position spaced apart from an outer surface of said screen means.

BRIEF DESCRIPTION OF THE ACCOMPANYING DRAWINGS

This invention will now be described by way of example only and with reference to the present invention, wherein:

FIG. 1 is a partial, diagrammatic side view of a screen simulator arrangement according to one form of the present invention, FIG. 2 is a partial, diagrammatic side view of a screen simulator arrangement according to a further form of the present invention and FIG. 3 is a partial, diagrammatic side view of a screen simulator arrangement according to yet a further form of the present invention.

DETAILED DESCRIPTION OF PREFERRED EMBODIMENTS OF THE PRESENT INVENTION

Figure 1:
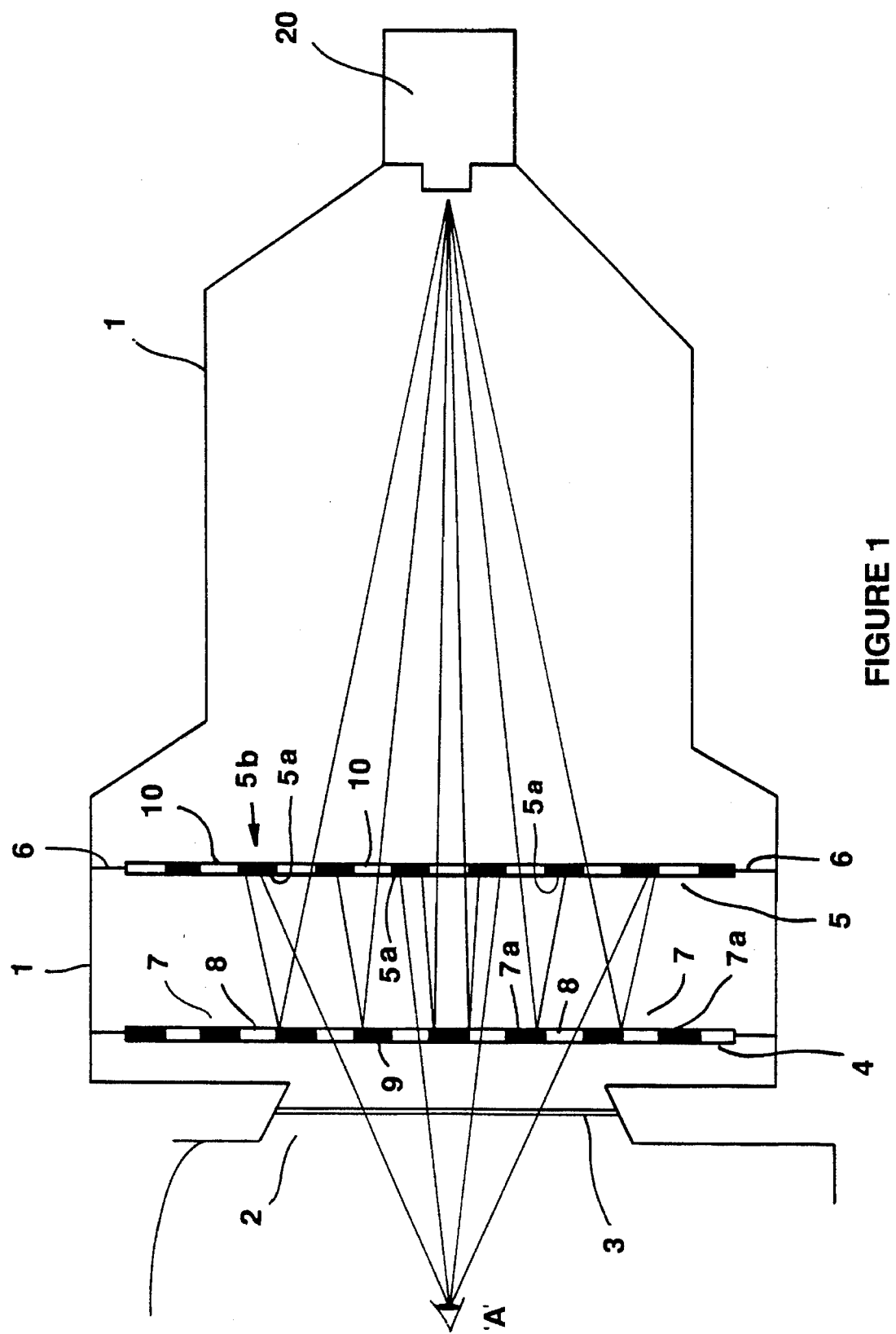

The invention will now be described by way of example only and with reference to the accompanying drawings. It should be appreciated however that the drawings are diagrammatic only and are used to describe, by way of example only, the various forms of the invention.

Referring to the accompanying drawings, it should be appreciated that these drawings show by way of example only the arrangement and relationship between the screen and one or more mirrors in the present invention, although the simulator arrangement will normally be found to be located within an appropriate housing or cabin, in which persons may be seated. In practice, such a housing or cabin 1 may have a body and window openings at the front and at each side, and in particular a window opening 2, within which is a window 3 of, for example, polarising glass. Arranged behind said window 3 is the housing 1, locating the screen and mirror means, in association with appropriate projection means. The screen means 4 and mirror means 5 are spaced apart and fixedly mounted (such as by brackets or frames 6) relative to each other. The screen means 4 is formed or provided of any appropriate screen material while the mirror means 5 is formed or provided of any appropriate mirror or reflective material.

The arrangement of the present invention includes at least one screen means 4 which has an inner screen surface 7 (for example adapted to have imagery projected thereon) while having a plurality of transparent portions 8 extending therethrough. A rear or outer surface 9 of the screen means 4 extends outwardly so as to be viewed by one or more viewers. As stated, the screen means 4 is provided with a plurality of spaced apart transparent portions 8 therein, which can be of transparent material or can be a plurality of holes or openings extending therethrough. Thus, the screen is in essence a partial screen, having a plurality of transparent portions or holes or openings 8 extending therethrough. The transparent portions in the screen are preferably distributed substantially uniformly thereover to produce a substantially uniform distribution of spaced apart screen portions on the inner surface 7 of the screen, which in essence form image or screen pixels 7a.

The transparent portions (holes/openings) 8 in the screen 7 should be sufficiently small to be individually indistinguishable at a viewing distance.

The screen simulator of the present invention further includes one or more mirror means 5 which are spaced apart from the inner screen surface 7 of the screen means 4. As will be described hereinafter, the present invention is described with reference to one screen means 4 and one mirror means 5, although if desired a plurality of mirror means can be provided spaced apart from and in association with the screen means 4, so that a reflective surface 5a of the mirror means 5 faces the inner screen surface 7 of the screen means 4.

In the preferred form of the invention, the mirror means 5 is spaced apart from the screen surface 7 and is provided with a plurality of holes or openings 10 extending therethrough, so that in essence, a partial mirror is formed. The screen means 4 and mirror means 5 are mounted within the housing 1 (such as by brackets or frames 6 and the like) so as to be fixedly secured relative to each other, with the transparent portions 8 of the screen means 4 and the holes or openings 10 of the mirror means 5 being substantially out of register one with the other. This in essence means that the portions/pixels 7a of the inner screen surface 7 of the screen means 4 will be in substantial alignment/register with openings or holes 10 in the mirror means, while reflective portions or pixels 5a of the mirror means 5 (separated by the holes or openings 10 in the mirror means 5) will be in substantial register with transparent portions or openings 8 in the screen means 4.

The holes or openings 10 in the mirror means 5 are preferably uniformly distributed, and are preferably of such a size as to be individually indistinguishable at a viewing distance.

Projection means 20 are located rearwardly of the mirror means 5 and project imagery towards the rear surface 5b of the mirror means 5, so that the imagery passes through the holes or openings 10 in the mirror means 5. This imagery passing through the holes or openings 10 in the mirror means 5 is shown on the screen pixels 7a on the inner surface 7 of the screen means 4, this imagery then being reflected in reflective portions or pixels 5a of the mirror means 5, to be viewed through the transparent portions 8 in the screen means 4, so as to be viewed by one or more persons spaced apart from the outer surface 9 of the screen means 4. The reflected imagery will be therefore viewed through the plurality of uniformly distributed and spaced apart transparent portions 8 in the screen means 4. As discussed, the transparent portions 8 in the screen means 4 are sufficiently small and are individually indistinguishable, at a viewing distance.

Referring now to FIG. 1 of the accompany drawings, screen means 4 and mirror means 5 are shown substantially in parallel, spaced apart one from the other. As will be appreciated, the screen means 4 and mirror means 5 are fixedly mounted as at 6 within a housing or cabin 1 so as to be fixedly mounted relative to each other. Projection means 20 are provided either in association with an appropriate housing 1 or spaced apart rearwardly from the rear surface 5b of the mirror means 5, so as to project imagery towards the screen simulator arrangement. Any appropriate projection means can be used to advantage.

The screen means 4 is provided with a plurality of transparent portions 8 (such as portions of transparent material) or holes or openings extending therethrough. These transparent portions 8 are uniformly distributed over the area of the screen means and are of a sufficiently small size as to be individually indistinguishable at a viewing distance. The plurality of transparent portions 8 forms (on the inner screen surface 7 of the screen means 4) a plurality of spaced apart screen pixels 7a. Fixedly mounted in a position spaced apart inwardly from, and facing the surface 7 of the screen means 4, is at least one mirror means 5 in the form of a mirror or reflective material having a reflective surface on at least the inner surface thereof. A plurality of holes or openings 10 are provided and extending through the mirror means 5 so that on the inner surface of the mirror means (facing inwardly towards the screen surface 7 of the screen means 4), a plurality of mirror pixels 5a are formed or provided.

The screen and mirror means 4, 5, are so mounted relative to each other that the transparent portions 8 of the screen means 4 and openings or holes 10 of the mirror means are substantially out of register. This results in the inwardly facing screen pixels 7a of the screen means 4 being in substantial alignment or register with the holes or openings 10 extending through the mirror means 5.

As referred to above, projection means 20 are provided and on actuation thereof, light and imagery therefrom will extend towards the rear surface 5a of the mirror 5, to pass through the openings or holes 10 therein, to appear on the screen pixels 7a on the inner surface 7 of the screen means 4. The imagery appearing on the screen pixels 7a and light, will be then reflected by the inner mirror surfaces or reflective surfaces (mirror pixels) 5a of the mirror means 5 to be viewed through the plurality of illuminated, uniformly distributed and spaced apart transparent portions 8 in the screen means 4, from a position 'A' spaced from an outer surface 9 of the screen means 4 so as to present simulated situations or happenings.

In a preferred form of the invention the screen means 4 and mirror means 5 are flat and spaced apart parallel one from the other.

It should also be appreciated that the transparent portions 8 between the screen pixels 7a and the holes or openings 10 in the mirror means 5 must be sufficiently small and so distributed, as to be indiscernible to the eyes, so that the illumination of individually reflected pixels appears as a single, coherent image at virtual infinity, when viewed for example from position 'A' spaced from the outer surface 9 of the screen means 4.

Figure 2:
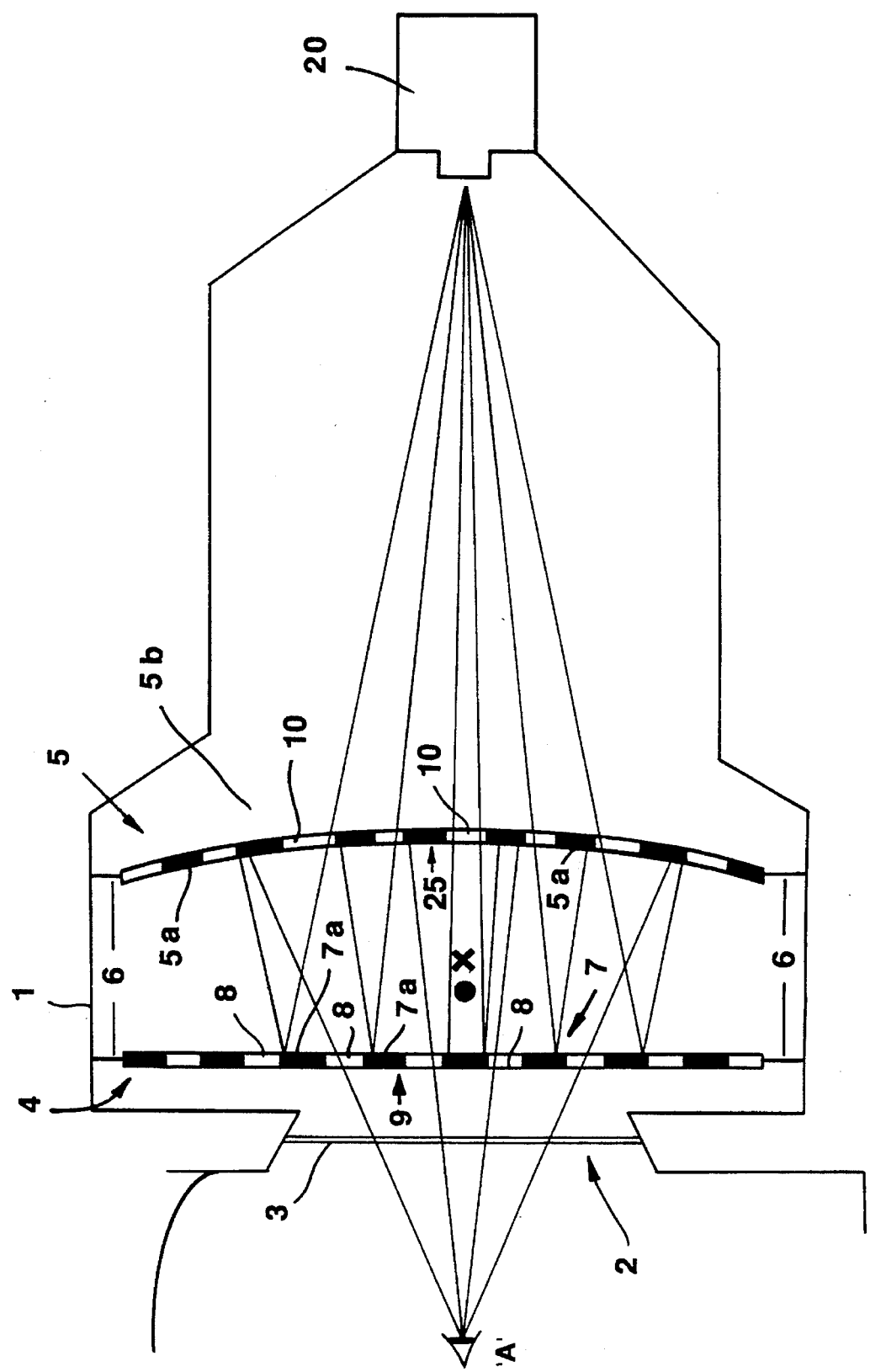

Referring now to FIG. 2 of the accompanying drawings, the arrangement of the present invention includes at least one curved concave mirror 5, the concave surface 25 facing inwardly towards the inner screen surface 7 of the screen means 4. It has been found that the use of such a concave mirror surface 25, as shown by way of example in FIG. 2 of the drawings, substantially enhances the depth of imagery and infinity as shown by way of example in FIG. 2 of the accompanying drawings.

Figure 3:
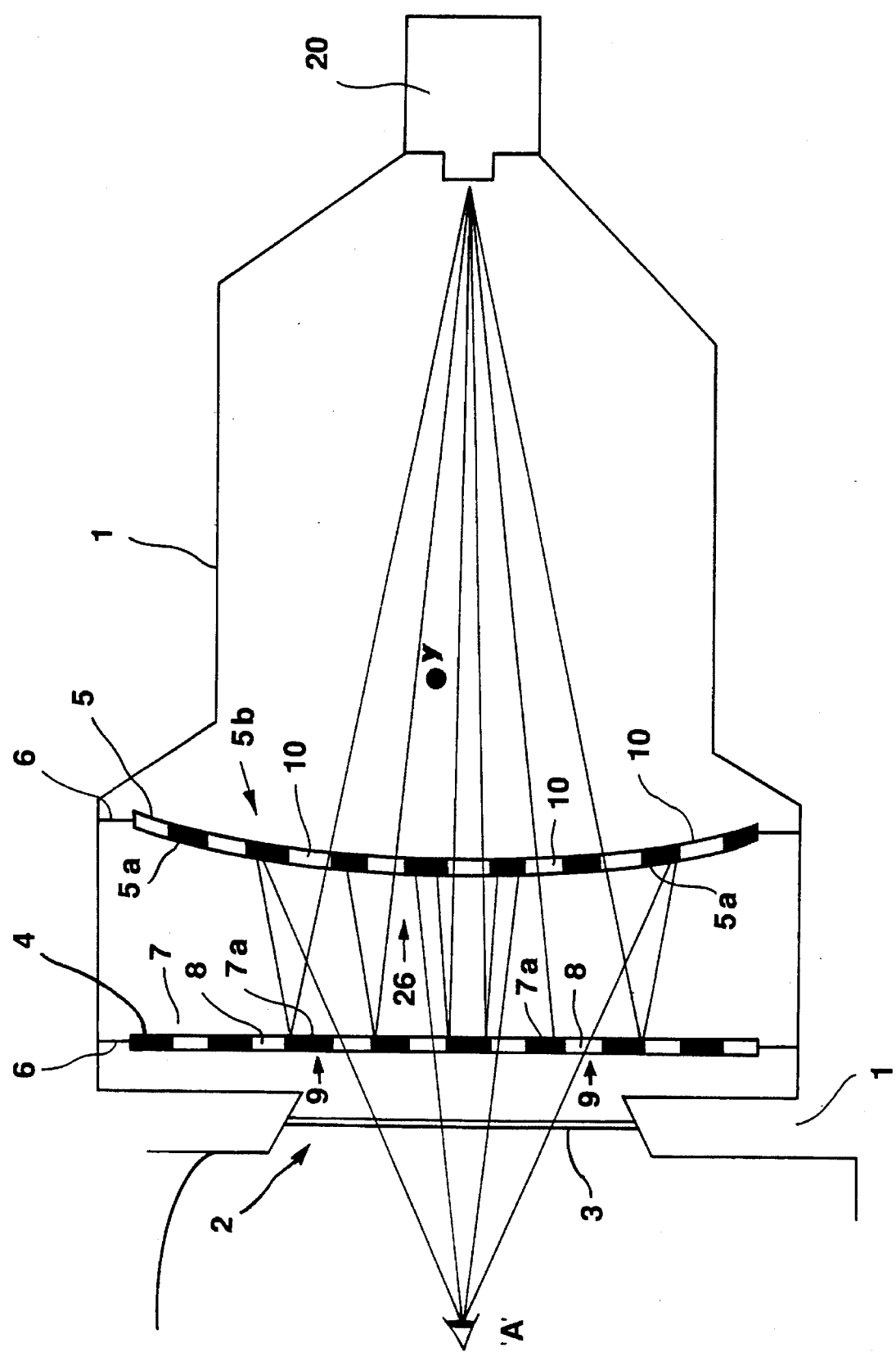

Referring now to FIG. 3 of the accompanying drawings, in this form of the invention a curved mirror 5 of a substantially convex configuration is provided, the convex surface 26 facing inwardly towards the inner screen surface 7 of the screen means 4. Again, this has been found to enhance substantially the depth of imagery, according to the present invention.

In further forms of the invention it is envisaged that a plurality of mirror means and/or curved mirror means can be provided to further enhance the depth of imagery and to place imagery at virtual infinity, in whatever direction is required. By way of example only, the generally concave mirror surface 25 shown in FIG. 2 of the accompanying drawings will enhance the depth of imagery to the extent that the imagery will appear at substantially the position "X" shown in FIG. 2 of the drawings. In a further form of the invention however, as shown by way of example only, with reference to FIG. 3 of the drawings, the use of a convex mirror surface 26 will cause the imagery to appear as shown generally by way of example only, at substantially the position "Y" shown in FIG. 3 of the drawings.

In further forms of the invention a plurality of curved mirrors and/or generally flat parallel mirrors can be provided, to further enhance the depth of imagery and the positioning of the imagery.

Utilising the features of the present invention, and in particular taking into account the advantages and features of the screen and one or more mirrors being in parallel one with the other, the invention permits the construction of a simulator window that enhances realism, by making it impossible for viewers to see beyond the framing edges of the screen and/or mirrors. In other words, it is impossible to see beyond the framing edges, to the image generating equipment beyond it. This then avoids degrading the imagery and restricts the imagery to the bounds of the viewing window and/or screen. This is a particular advantage of the present invention.

The present invention provides a substantial advance in screen simulator arrangements, which overcomes problems associated with such screen simulator arrangements known up until this time. In particular, the fixed location of the screen means 4 and one or more mirror means 5 in substantial parallel, provides substantial advances over the previously known arrangements. In particular those that involve moving screens and parts. The present invention provides for far greater flexibility of use and the display of imagery at greater and more varying depths of vision.

The invention has been described by way of example only and improvements and modifications may be made to the invention without departing from the scope thereof as defined by the appended claims.

I claim:

1. A screen simulator arrangement including spaced apart screen means adapted to allow viewing of imagery and one or more mirror means adapted to cause partial reflection of imagery; said screen means being formed with a plurality of spaced apart transparent portions therein producing a distribution of screen pixels in said screen means; said mirror means including at least one curved mirror and being formed or provided with a plurality of holes or openings therein, producing a plurality of reflective portions in said mirror means; said screen means and said mirror means being fixedly mounted relative to each other; the transparent portions of said screen means and the holes or openings of said mirror means being substantially out of register one with the other; an inner screen surface of said screen means and a reflective surface of said mirror means generally facing inwardly towards each other; said transparent portions of said screen means and said holes or openings of said mirror means being so out of register one with the other, such that said screen pixels of said screen means are in substantial alignment/register with holes or openings in said mirror means; the arrangement being such that a projector spaced apart from an outer surface of said mirror means projects images at said outer surface thereof, and through said holes or openings therein, so that imagery will appear on said screen pixels of said screen means in substantial alignment/register with said holes or openings in said mirror means; said imagery being so reflected by said reflective portions of said mirror means, so as to be viewable through said transparent portions in said screen means, from a position spaced apart from an outer surface of said screen means.

2. A screen simulator arrangement including spaced apart screen means adapted to allow viewing of imagery and one or more mirror means adapted to cause partial reflection of imagery; said screen means being formed with a plurality of spaced apart transparent portions therein producing a distribution of screen pixels in said screen means; said mirror means being formed or provided with a plurality of holes or openings therein, producing a plurality of reflective portions in said mirror means; said screen means and said mirror means being fixedly mounted relative to each other; the transparent portions of said screen means and the holes or openings of said mirror means being substantially out of register one with the other; an inner screen surface of said screen means and a reflective surface of said mirror means generally facing inwardly towards each other; said mirror means including at least one concave mirror means having a concave surface facing inwardly towards said inner screen surface of said screen means; said transparent portions of said screen means and said holes or openings of said mirror means being so out of register one with the other, such that said screen pixels of said screen means are in substantial alignment/register with holes or openings in said mirror means; the arrangement being such that a projector spaced apart from an outer surface of said mirror means projects images at said outer surface thereof, and through said holes or openings therein, so that imagery will appear on said screen pixels of said screen means in substantial alignment/register with said holes or openings in said mirror means; said imagery being so reflected by said reflective portions of said mirror means, so as to be viewable through said transparent portions in said screen means, from a position spaced apart from an outer surface of said screen means.

3. A screen simulator arrangement including spaced apart screen means adapted to allow viewing of imagery and one or more mirror means adapted to cause partial reflection of imagery; said screen means being formed with a plurality of spaced apart transparent portions therein producing a distribution of screen pixels in said screen means; said mirror means being formed or provided with a plurality of holes or openings therein, producing a plurality of reflective portions in said mirror means; said screen means and said mirror means being fixedly mounted relative to each other; the transparent portions of said screen means and the holes or openings of said mirror means being substantially out of register one with the other; an inner screen surface of said screen means and a reflective surface of said mirror means generally facing inwardly towards each other; said mirror means including at least one substantially convex mirror means, having a convex surface facing inwardly towards said inner screen surface of said screen means; said transparent portions of said screen means and said holes or openings of said mirror means being so out of register one with the other, such that said screen pixels of said screen means are in substantial alignment/register with holes or openings in said mirror means; the arrangement being such that a projector spaced apart from an outer surface of said mirror means projects images at said outer surface thereof, and through said holes or openings therein, so that imagery will appear on said screen pixels of said screen means in substantial alignment/register with said holes or openings in said mirror means; said imagery being so reflected by said reflective portions of said mirror means, so as to be viewable through said transparent portions in said screen means, from a position spaced apart from an outer surface of said screen means.

* * * * *